April 12, 1955 M. E. BUEHLER 2,706,265

MULTI-COMMUTATED CHANNEL AMPLIFIER

Filed Sept. 20, 1951 2 Sheets-Sheet 1

INVENTOR.
MAURICE E. BUEHLER
BY Theodore C. Wood
AGENT—
Wade Koontz
ATTORNEY—

INVENTOR.
MAURICE E. BUEHLER
BY Theodore C. Wood
AGENT
Wade Koontz
ATTORNEY

United States Patent Office 2,706,265
Patented Apr. 12, 1955

2,706,265

MULTI-COMMUTATED CHANNEL AMPLIFIER

Maurice E. Buehler, San Diego, Calif.

Application September 20, 1951, Serial No. 247,540
6 Claims. (Cl. 315—24)
(Granted under Title 35, U. S. Code (1952), sec. 266)

The invention described herein may be manufactured and used by or for the Government for governmental purposes without payment to me of any royalty thereon.

This invention relates to apparatus for successively commutating a plurality of signal channels and more particularly to apparatus for successively commutating a plurality of signal channels which are applied to the signal input of a cathode ray oscilloscope, whereby the signals are applied successively at a rate such that those signals appear to be simultaneous.

In the prior art of successive commutation of a plurality of signal channels there are many undesirable characteristics which the apparatus of my invention proposes to overcome.

An object of this invention is to provide apparatus for commutating a signal channel wherein the signal channel provides uniform transmission of signals regardless of the signal frequency.

It is another object of this invention to provide an improved electronic sequential switching arrangement for the individual transmission channels of a multiple presentation type oscilloscope wherein the individual channels are switched at a rate which bears a predetermined relationship to the repetition rate of the time base being used for the observation.

In the previous known types of signal channels which are successively commutated, the various individual channels had their gain varied as a function of the amplitude of the commutating signal, therefore, a distortion of the signal was produced when the commutating signal was not precisely a rectangle signal.

It is a still further object of this invention to provide an electronic sequential switching arrangement for a plurality of signal channels wherein the amplitude or wave form of the commutating signal has no appreciable effect on the gain of the individual channels and therefore no distortion is introduced by the sequential switching arrangement.

In the previous known art of multiple presentation type of oscilloscopes, wherein the individual signal channels are sequentially switched, switching transients are oftentimes generated and appear in the output circuit and since those transients have a considerably larger amplitude than the signal to be observed, proper operation of the oscilloscopes cannot be obtained.

It is still a further object of this invention to provide electronic sequential switching of a plurality of signal channels wherein switching transients have substantially no effect upon the signals being observed.

These objects as well as other objects and advantages obtained by the apparatus of my invention will be more fully understood with reference to the following description when taken in conjunction with the drawings wherein.

Figure 1:
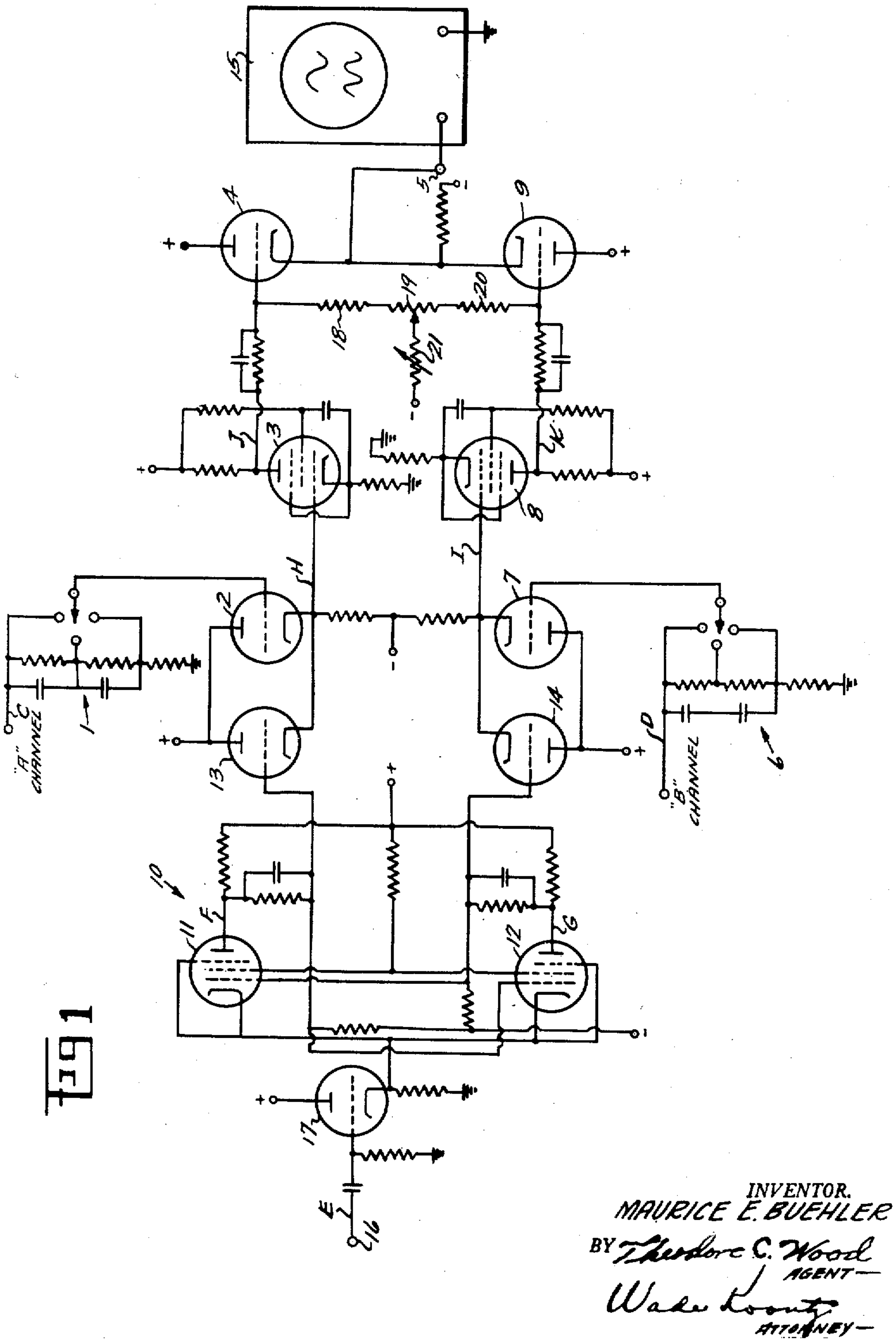
Figure 1 is a schematic circuit diagram of a signal commutating system of my invention as applied to a cathode ray oscilloscope.

Referring now to the drawings and more particularly to Figure 1 thereof, the signal applied to channel A is preferably attenuated through a suitable attenuator network such as network 1 and the resulting signal is then applied to a control grid of electron tube 2 whose circuit forms a conventional cathode follower, the output signal is then applied to the control grid of electron tube 3 whose circuit forms an amplifier, the output of that amplifier is then fed to the control grid of electron tube 4 whose circuit forms a conventional cathode follower, the output signal of that cathode follower appears at the output terminal 5.

The signal applied to channel B is preferably attenuated through a suitable attenuator network such as network 6 and the resulting signal is then applied to the control grid of electron tube 7 whose circuit forms a conventional cathode follower, the output is then applied to the control grid of electron tube 8 whose circuit forms an amplifier, the output signal of that amplifier is applied to the control grid of electron tube 9 whose circuit forms a conventional cathode follower, and the output signal of that cathode follower appears at the output terminal 5.

In order to cause switching of the two above mentioned channels a relaxation type oscillator preferably of the synchronized type, is provided. The relaxation oscillator indicated generally at 10 consists of electron tube 11 and electron tube 12 and their associated circuitry which is conventional and well known in the art.

When the electron tube 11 of the relaxation oscillator is conducting, a voltage will be applied to the control grid of electron tube 13 which is sufficiently negative with respect to the voltage at its cathode to prevent tube 13 from conducting, under this condition the signal applied to the control grid of electron tube 2 causes a voltage proportional to the signal to be developed at its cathode which is then amplified by electron tube 3 whose output is applied to the control grid of electron tube 4 and thus a voltage proportional to the signal applied to the input of channel A appears at the output 5. Under this same condition, that is, when electron tube 11 of the relaxation oscillator 10 is conducting, a voltage is applied to the control grid of electron tube 14 and that voltage is sufficiently positive with respect to the voltage applied to its cathode to cause that tube to conduct and when that tube conducts the voltage at the cathode of electron tube 7 is sufficiently positive with respect to its control grid to cause that tube to be made nonconducting and therefore the signal applied to the input of channel B is ineffective to produce an output proportional thereto at the output 5.

In the preferred embodiment of this invention, the above described signal channel commutating system is applied to a multiple presentation type cathode ray tube oscilloscope 15. Since in that type of system it is often desirable that the repetition rate of channel switching be coincident with, or bear a predetermined time relation to, the horizontal sweep voltage applied to the oscilloscope, the positive synchronizing pulses are applied to the sync. input 16 which is connected to the control grid of electron tube 17 which forms a conventional cathode follower and the output pulses from that cathode follower synchronize the frequency of the relaxation oscillator 10. The synchronizing signals may be obtained from the signals to be observed, from the sweep generator of the oscilloscope or from any other suitable source.

In order that the signals in one channel may be presented on the oscilloscope face at a position above the signals of the other channel, a constant D. C. signal which may be varied at will is introduced by the impedance network consisting of resistors 18, 19, 20 and 21 in the control grid circuits of electron tubes 4 and 9.

*Operation*

Figure 2:
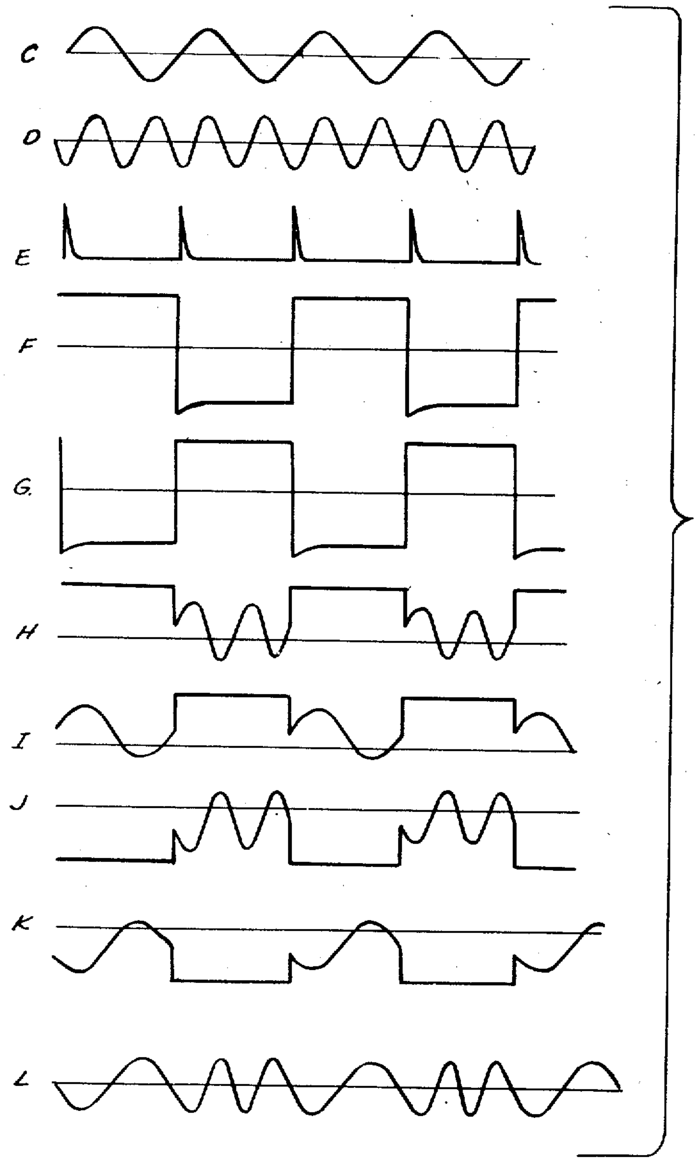
Figure 2 are curves representing the instantaneous voltage characteristic of voltages taken at correspondingly indentified points of the circuit of Figure 1.

In order to more fully understand the principles, features and operation of the system of my invention, reference is now had to Figure 2 wherein the signals at any given instant of time of various points throughout the circuits of Figure 1 are shown.

The curve C illustrates the signal C applied to the input channel A.

The curve D illustrates the signal applied to channel B.

The curve E illustrates the synchronizing pulses applied to the sync. input 16.

The curve F illustrates the potentials at the output of electron tube 11 which voltages are then supplied to the control grid of electron tube 13.

The curve G illustrates the potentials at the output of electron tube 12 which potentials are then applied to the control grid of electron tube 14.

The curve H illustrates the voltage at the output of electron tube 2 which is then applied to the control grid of electron tube 3.

The curve I illustrates the potentials at the output of electron tube 7 which are then applied to the control grid of electron tube 8.

The curve J illustrates the output of electron tube 3 which is then applied to the control grid of electron tube 4.

The curve K illustrates the output of electron tube 8 which is then applied to the control grid of electron tube 9 and since the electron tubes 4 and 9 have a common output or cathode circuit, the curve L illustrates the output of the electron tubes 4 and 9 which is the output appearing at output terminal 5.

Under the conditions of operation wherein electron tube 13 is conducting and electron tube 14 is cut off, it is obvious that the peak negative value of the input signal applied to channel A must be controlled so as to be smaller than peak negative value which would just allow electron tube 13 to be conducting on the negative swing of the input signal applied to channel A. Likewise, considering electron tube 14, it is obvious that the peak positive value of the input signals applied to channel B must be smaller than the peak value which will allow electron tube 14 to be conducting during the peak positive swing of the input signal applied to channel B. To insure that those conditions are satisfied the input signals in channel A and channel B are attenuated to the proper amount by their respective attenuators 1 and 6.

With reference to electron tube 3, the positive signal which is applied to its grid during the period of cutoff of electron tube 2 is reversed in phase by electron tube 3 and cuts off electron tube 4, thus allowing electron tube 9 to operate during this period. Electron tube 8 functions in a similar capacity during the succeeding half cycle of operation. It is therefore obvious that the phase reversing properties of electron tubes 3 and 8 are essential to the proper functioning of the commutated amplifier, and any amplification obtained is purely for the purpose of accommodating the characteristics of the particular electron tubes and circuit voltage levels used.

Although this invention has been illustrated and described as being applied to a signal system having only two channels, it will be obvious to those skilled in the art that this invention could as well be applied to signal systems having any given number of channels.

Although this invention has been illustrated and described in connection with a specific embodiment, it will be understood that many modifications, additions and omissions may be made without departing from the spirit and scope of this invention.

What is claimed is:

1. A multiple presentation type cathode ray oscilloscope comprising a cathode ray tube having means to form an electron beam, sweep means to cause said beam to be successfully deflected in a predetermined direction at a predetermined rate, and voltage responsive means to cause said beam to be deflected in a different predetermined direction; a first electron discharge device having at least an anode, a cathode and a control grid, a second electron discharge device having at least an anode, a cathode and a control grid, a first signal input connected to the control grid of said first electron discharge device, a second signal input connected to the control grid of said second electron discharge device, an output circuit connected between the anode and cathode of said first electron discharge device, an output circuit connected between the anode and cathode of said second electron discharge device, means for permanently coupling the voltage responsive means of said cathode ray tube to the output circuits of said first and second electron discharge devices, means to successively cause the voltage at the cathode of said first electron discharge device to be of such a value as to make that device nonconducting while the voltage at the cathode of said second electron discharge device is of such a value as to make that device conducting and then to cause the voltage at the cathode of said first electron discharge device to be of such a value as to make that device conducting while the voltage at the cathode of said second electron discharge device is of such a value as to make that device nonconducting.

2. Apparatus according to claim 1 wherein means are provided to cause the successive application of the voltages to the cathodes of the first electron discharge device and the second electron discharge device to take place at a rate which bears a predetermined relationship to the rate at which the sweep means causes the beam to be successively deflected in a predetermined direction.

3. A multiple presentation type cathode ray oscilloscope comprising a cathode ray tube having means to form an electron beam, sweep means to cause said beam to be successively deflected in a predetermined direction at a predetermined repetition rate, and voltage responsive means to cause said beam to be deflected in a different predetermined direction; a first signal input, a first electron discharge device having at least an anode, a cathode and a control grid, a cathode circuit for said first electron discharge device including a first resistor, means to connect said first signal input to said control grid, means to cause said voltage responsive means of said cathode ray tube to respond to the voltage drop across said first resistor, a second signal input, a second electron discharge device having at least an anode, a cathode and a control grid, a cathode circuit for said second electron discharge device including a second resistor, means to connect said second signal input to said control grid of said second electron discharge device, means to cause said voltage responsive means of said cathode ray tube to respond to the voltage drop across said second resistor, and means to cause sufficient current to flow through the resistor in the cathode circuit of said first electron discharge device to cause said first electron discharge device to be made nonconducting while said second electron discharge device is conducting and then to cause sufficient current to flow through the resistor in the cathode circuit of said second electron discharge device to make said second electron discharge device to be made nonconducting while said first electron discharge device is conducting.

4. An electronic switch comprising a first electron discharge device having at least an anode, a cathode and a control grid, a second electron discharge device having at least an anode, a cathode and a control grid, a first signal input connected to the control grid of said first electron discharge device, a second signal input connected to the control grid of said second electron discharge device, an output circuit connected between the anode and cathode of said first electron discharge device, an output circuit connected between the anode and cathode of said second electron discharge device, a common output circuit, means for permanently coupling said common output circuit to the output circuits of said first and second electron discharge devices, means to successively cause the voltage at the cathode of said first electron discharge device to be of such a value as to make that device nonconducting while the voltage at the cathode of said second electron discharge device is of such a value as to make that device conducting and then to cause the voltage at the cathode of said first electron discharge device to be of such a value as to make that device conducting while the voltage at the cathode of said second electron discharge device is of such a value as to make that device nonconducting.

5. An electronic switch comprising a first electron discharge device having at least an anode, a cathode and a control grid, a second electron discharge device having at least an anode, a cathode and a control grid, a first signal input connected to the control grid of said first electron discharge device, a second signal input connected to the control grid of said second electron discharge device, means to apply the signal output of said first electron discharge device and the signal output of said second electron discharge device to a common output circuit, a first resistor in the cathode circuit of said first electron discharge device, a second resistor in the cathode circuit of said second electron discharge device, a third electron discharge device having at least an anode, a cathode and a control grid, a fourth electron discharge device having at least an anode, a cathode and a control grid, an anode-cathode circuit for said third electron discharge device including said first resistor, an anode-cathode circuit for said fourth electron discharge device including said second resistor, and control means to successively apply a sufficient voltage to the control grid of said third electron discharge device to make that device conducting while applying a sufficient voltage to the control grid of said fourth electron discharge device to make that device nonconducting and then to apply a sufficient voltage to the control grid of said third electron discharge device to make that device nonconducting while applying a sufficient voltage to the control grid of said fourth electron discharge device to make that device conducting.

6. An electronic switch according to claim 5 wherein said control means comprises a relaxation oscillator whose period of oscillation can be controlled by a source of synchronizing pulses.

References Cited in the file of this patent

UNITED STATES PATENTS

| | | |
|---|---|---|
| 2,471,530 | Lobel | May 31, 1949 |
| 2,568,927 | Morrison | Sept. 25, 1951 |
| 2,570,139 | Maxwell | Oct. 2, 1951 |
| 2,584,144 | Maresca | Feb. 5, 1952 |